(12) United States Patent
Serafini et al.

(10) Patent No.: US 8,641,410 B2
(45) Date of Patent: Feb. 4, 2014

(54) MOLD FOR FOOTWEAR BOTTOMS

(75) Inventors: Mauro Serafini, Ancarano (IT); Nicola Vecchiola, Montegranaro (IT)

(73) Assignee: Finproject S.p.A., Morrovalle (IT)

( * ) Notice: Subject to any disclaimer, the term of this patent is extended or adjusted under 35 U.S.C. 154(b) by 22 days.

(21) Appl. No.: 13/463,305

(22) Filed: May 3, 2012

(65) Prior Publication Data
US 2012/0282366 A1 Nov. 8, 2012

(30) Foreign Application Priority Data

May 4, 2011 (IT) .............................. MC2011A0024

(51) Int. Cl.
*B29C 45/32* (2006.01)

(52) U.S. Cl.
USPC .............................. 425/572; 264/255; 425/588

(58) Field of Classification Search
USPC .................................... 425/572, 588; 264/255
See application file for complete search history.

(56) References Cited

U.S. PATENT DOCUMENTS

| | | | |
|---|---|---|---|
| 3,305,895 A * | 2/1967 | Ludwig | 264/255 |
| 4,120,477 A * | 10/1978 | Justamante | 264/255 |
| 4,123,493 A * | 10/1978 | Schilke et al. | 264/255 |
| 4,345,965 A * | 8/1982 | Lindenmayer et al. | 425/572 |
| 5,433,022 A | 7/1995 | Lo et al. | |
| 7,700,021 B2 * | 4/2010 | Cox et al. | 264/255 |
| 2005/0133968 A1 * | 6/2005 | Foxen et al. | 264/255 |
| 2008/0073806 A1 | 3/2008 | Wang | |
| 2013/0134760 A1 * | 5/2013 | Sutton | 264/255 |

FOREIGN PATENT DOCUMENTS

| | | |
|---|---|---|
| EP | 1604795 A2 | 12/2005 |
| FR | 2548950 A1 | 1/1985 |
| GB | 1126909 A | 9/1968 |
| WO | 2010-045144 A2 | 4/2010 |

OTHER PUBLICATIONS

Italian Search Report for MC2011A000024 dated Nov. 28, 2011.

* cited by examiner

*Primary Examiner* — Tim Heitbrink

(74) *Attorney, Agent, or Firm* — Lowe Hauptman & Ham, LLP

(57) ABSTRACT

A mold devised for molding of footwear bottoms, composed of overlapping layers made with expandible reticulable polyolefin material, as well as for molding of other manufactures with monolithic structure composed of overlapping layers of expandible reticulable polyolefin materials.

2 Claims, 6 Drawing Sheets

MOLD FOR FOOTWEAR BOTTOMS

RELATED APPLICATIONS

The present application is based on, and claims priority from, Italian Application Number MC2011A000024, filed May 4, 2011, the disclosure of which is hereby incorporated by reference herein in its entirety.

BACKGROUND

1. Field

The present patent application for industrial invention relates to a mold for footwear bottoms and other manufactures composed of two overlapping layers of expandible and reticulable polyolefin materials.

The invention has been devised with the specific intention to innovate and rationalize the production modes of a type of footwear bottoms that already exists on the market.

2. Description of Related Art

Reference is made to footwear bottoms formed of two overlapping layers made of expandible and reticulable polyolefin materials provided with different characteristics.

It may sometimes happen that the upper layer, which is designed to come in contact with the user's foot, needs to be softer and more comfortable and the lower layer, which is designed to interfere with the ground during walking, needs to be harder and more resistant to wear.

Special molds have been traditionally used for the realization of similar "double layer" bottoms, which are composed of two lids, each of them with corresponding cavity, designed to be interfaced with interposition of an intermediate closing plate.

Such a plate is able to simultaneously close the downward cavity of the upper lid and the upward cavity of the lower lid.

After suitably arranging such a mold, the two expandible reticulable polyolefin materials are hot injected, at fluid state, inside the cavities of the corresponding lids.

As it is known, in view of the high temperature, these materials are subject to a process defined as "reticulation", which causes a considerable increase in volume.

This allows said materials to exactly fill the cavities of the lids and be perfectly molded inside them.

Before completing the reticulation process, the two lids are separated and the closing intermediate plate is removed.

Immediately afterwards, the two lids are placed one against the other, in such a condition to perfectly interface their cavities.

A further consequence of said operation is that the lower side of the layer of expandible reticulable polyolefin material that is still contained in the cavity of the upper lid is brought directly in contact against the upper side of the expandible reticulable polyolefin material that is still contained in the cavity of the lower lid.

Considering that the two layers of expandible reticulable polyolefin materials are still in reticulation phase and tend to increase additionally in volume, it appears evident that mutual penetration is formed between said contact surfaces, corresponding to irreversible connection.

Whereas it is true that such a technology has proved rather reliable from the technical-functional view point, it has been quite unsatisfactory in terms of aesthetics.

In particular, such an aesthetical drawback appears when the aforementioned technique is used to produce a footwear bottom composed of two overlapping layers of expandible reticulable polyolefin materials with different color.

In such a case, in fact, said penetration between the contact surfaces of the two molding materials causes the inevitable mutual contamination of the two colors.

In view of the above, the line that should mark the separation between the two overlapping layers on the perimeter side of the bottom acquires an indefinite irregular color, which is extremely inadequate for the aesthetical pleasantness of the bottom.

BRIEF SUMMARY

Starting from similar critical evaluations, the specific purpose of the present invention is to devise a mold that allows for obtaining a footwear bottom that is aesthetically perfect, in spite of being formed of two overlapping layers of expandible reticulable polyolefin materials with different color.

In fact, the new mold of the invention allows for obtaining a clear separation line between said overlapping layers of different colors along the entire perimeter side of the bottom.

The penetration that is necessary between the contact surfaces of the two overlapping layers (for the realization of the monolithic bottom), is accurately avoided in correspondence of the side of the bottom.

This ensures the perfectly clean shape and chromatic accuracy of the bottom.

Similar purposes have been achieved with the new mold of the invention that, although being provided with a general structure similar to a traditional mold formed of two lids and intermediate plate, is characterized by some extremely significant features for the optimal result of the molding process performed with it.

Nevertheless, it must be noted that, although so far it has been devised for the realization of footwear bottoms, the present invention can be used to realize different manufactures composed of two different expandible reticulable polyolefin materials.

Reference is made, for instance, to clogs, sandals and boots with monolithic structure, characterized in that they use a first material in correspondence of the bottom and a second expandible reticulable polyolefin material in correspondence of the upper.

Moreover, reference is made to any other manufacture, including those manufactures that are not expressly designed for the footwear sector, with structure compatible with the technology of the invention.

BRIEF DESCRIPTION OF SEVERAL VIEWS OF THE DRAWINGS

For purposes of clarity, the description of the invention continues with reference to the enclosed drawings, which are intended for purposes of illustration only and not in a limiting sense, wherein.

DETAILED DESCRIPTION

Figure 1:
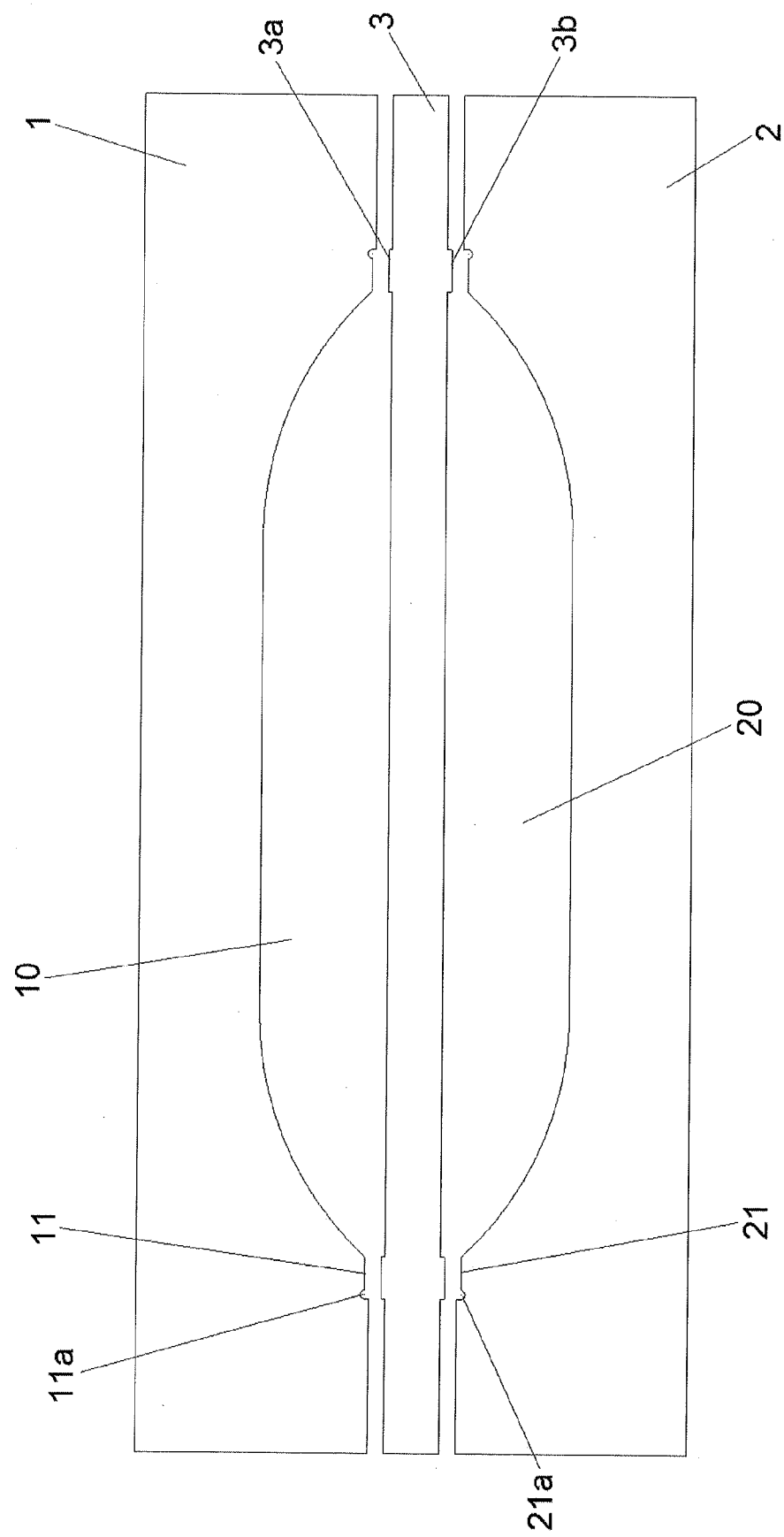
FIG. 1 is a cross-sectional view of the three parts of the new mold of the invention, which are still separated in non-operating condition.

Referring to the enclosed figures, the mold of the invention is traditionally composed of three cooperating parts, meaning:

an upper lid (1) adapted to mold a first layer (S1) of expandable reticulable polyolefin material a lower lid (2) adapted to mold a second layer (S1) of expandable reticulable polyolefin material an intermediate plate (3) adapted to be positioned between said two lids (1, 2).

Traditionally, the cavities (10, 20) of the two lids (1, 2) are mutually facing and said intermediate plate (3) simultaneously closes the cavity (10) of the upper lid (1) from below and the cavity (20) of the lower lid (2) from above.

Within such a traditional configuration, the first peculiarity of the mold of the invention consists in that the cavity (10) of the upper lid (1) is joined on the entire perimeter with a channel (11) ending with a narrow groove (11*a*) with higher height.

Likewise, the cavity (20) of the lower lid (2) is joined with a channel (21) that is perfectly specular with the channel (11) provided on the upper lid (1), also with reference to the common presence of the end groove (21*a*).

A further peculiarity of the mold of the invention consists in the fact that said intermediate plate (3) is provided, in correspondence of its opposite sides, with two specular ribs (3*a*, 3*b*) adapted to be respectively engaged into the channel (11) of the upper lid (1) and into the channel (21) of the lower lid (2) for their entire development.

After illustrating the configuration of the mold of the invention, this description continues with an explanation of its operating modes.

Initially, the three parts (1, 2, 3) of the mold are put together, exactly engaging one against the other.

In such a way the intermediate plate (3) is able to effectively close the cavities (10, 20) of the two lids (1, 2), whereas said ribs (3*a*, 3*b*) are engaged into the corresponding perimeter channels (11, 21) of the lids (1, 2).

Figure 2:
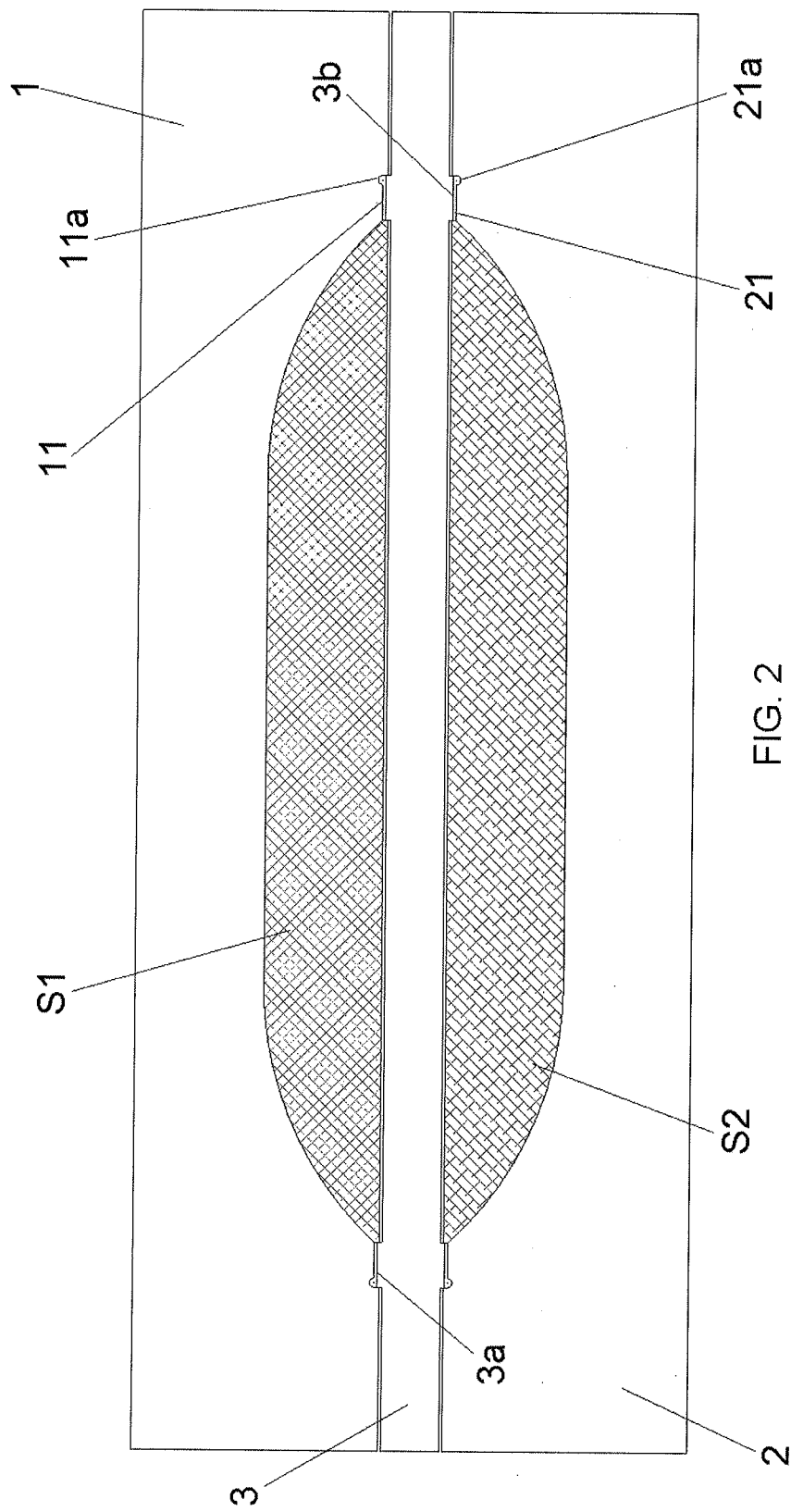
FIG. 2 is the same as the previous one, except for it shows the three parts in compact operating condition, further to injection of the two expandible reticulable polyolefin materials.

Once preparation of the mold is completed, two molding materials (preferably with different color) are injected inside the first (1) and the second (2) of the two lids (1, 2), originating the initial outline of the two future overlapping layers (S1, S2) of the footwear bottom to be realized, as is expressly shown in FIG. 2.

Moreover, it must be considered that the engagement of said ribs (3*a*, 3*b*) of the intermediate plate (3) inside the perimeter channel (11, 21) of the two lids (1, 2) prevents the molding materials from filling the adjacent channels (11, 21), in addition to the cavities (10, 20) of the lids (1, 2).

Figure 3:
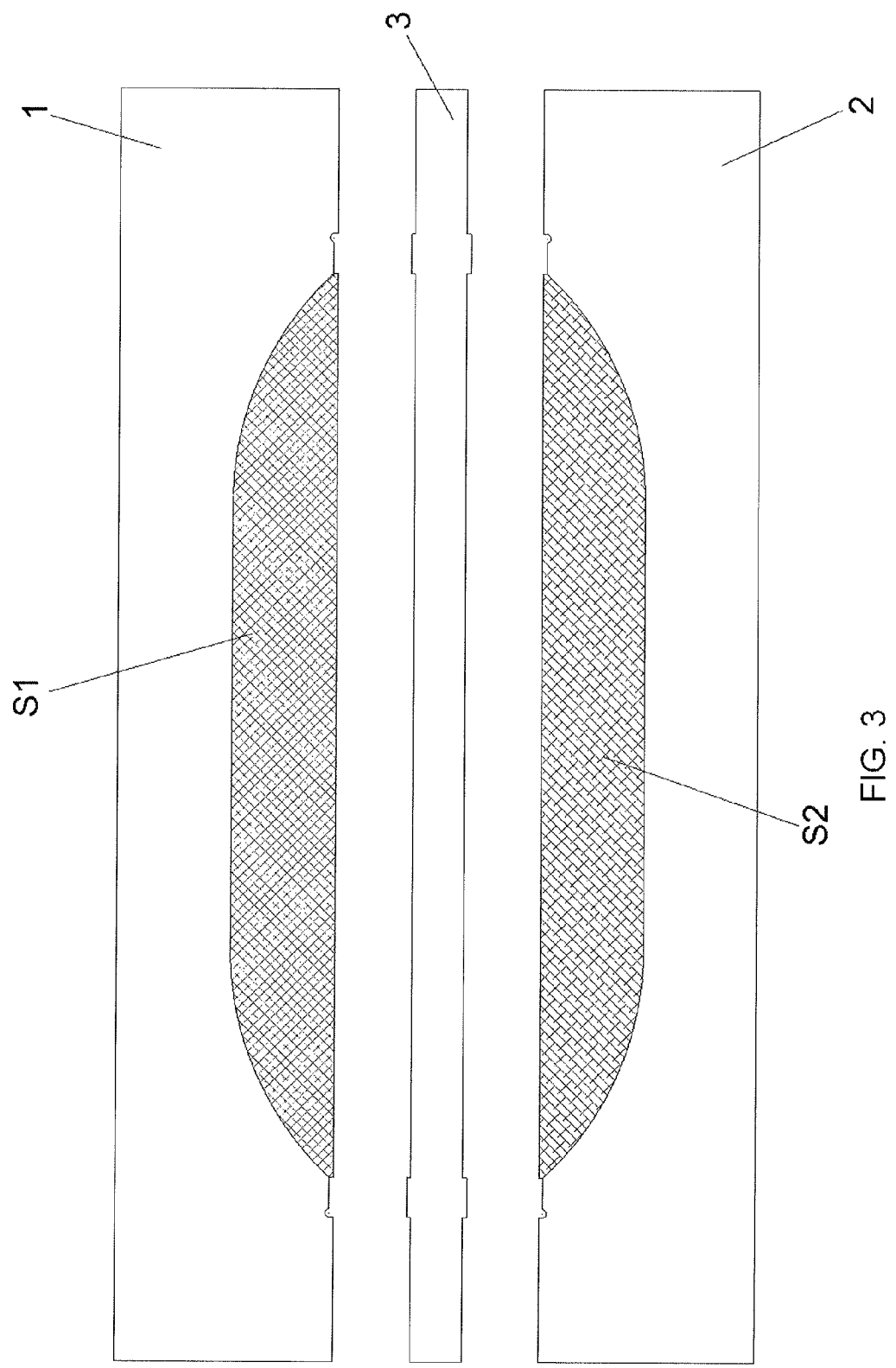
FIG. 3 is the same as the previous one, except for it shows the two lids of the mold of the invention separated in order to remove the intermediate plate.

Once injection of said molding materials is completed, the two lids (1, 2) are opened to remove said intermediate plate (3), as expressly shown in FIG. 3.

Figure 4:
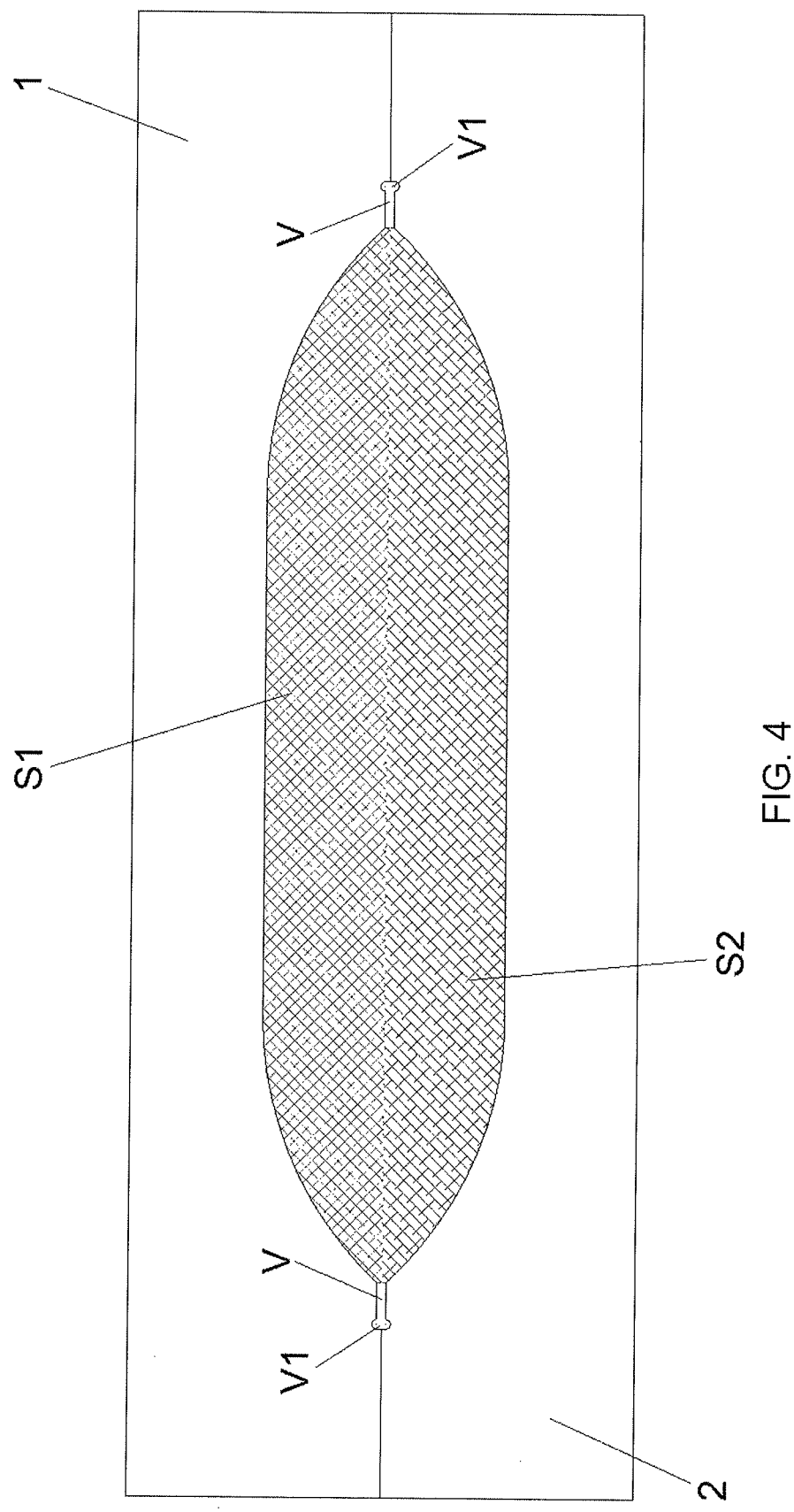
FIG. 4 is the same as the previous one, except for it shows the two lids in direct contact, without the interposition of the intermediate plate.

After removing said intermediate plate (3), the lids (1, 2) are brought in contact one against the other, as shown in FIG. 4.

Therefore, the lower flat side of the upper layer (S1) of expandible reticulable polyolefin material, which is still contained in the upper lid (1), and the upper flat side of the lower layer (S2) of expandable reticulable polyolefin material, which is still contained in the lower lid (2), are exactly engaged, one against the other, for the entire surface.

During the same operation the channel (11) of the upper lid (1) is exactly interfaced with the corresponding channel (21) of the lower lid (2).

Thus, the two interfaced channels (11, 21) originate a flat tubular compartment (V) that defines the two cavities (10, 20) and is provided with higher height in correspondence of the most external end (V1) formed by the cooperation of the corresponding grooves (11*a*, 21*a*).

It must be noted that said interfacing operation of the two lids (1, 2) and corresponding layers of expandable reticulable polyolefin materials (S1, S2), which are still contained inside them, must be carried out while the latter have a high temperature during reticulation.

This condition guarantees mutual penetration between the two layers (S1, S2), with consequent irreversible adhesion, in correspondence of their entire contact surface.

A further effect generated in such a circumstance—because of the fact that the expandable reticulable polyolefin materials are normally subject to spontaneous expansion during reticulation—consists in the "guided" leakage of the two molding materials from the cavities (10, 20) of the two lids (1, 2) towards said perimeter compartment (V) that is completely filled.

It can be easily understood that the two molding materials that have simultaneously flown in said "escape" compartment (V) cannot avoid mixing and penetrating in an uncontrolled way inside the latter, originating—after setting—the formation of a thin seam (B) adapted to project perimetrally on the side of the bottom that is being realized, similar to a short horizontal wing.

Moreover, it must be noted that said perimeter seam (B) is surrounded by a thickened border (B1) that is generated by the stagnation of the two molding materials inside the end (V1) of the compartment (V).

Considering that such a seam (B) is formed by the uncontrolled penetration of the two molding materials, it appears evident that the same has an irregularly "composite" structure.

Moreover, considering that the two molding materials have different colors, it is evident that said perimeter seam (B) has an irregular, indefinite "mixed" color.

It is true, however, that the presence of said perimeter "escape" compartment (V) guarantees that the two different materials are not subject to a similar effect (i.e. uncontrolled penetration) outside the compartment (V) or at the height of the side of the bottom that is generated by overlapping the two layers (S1, S2).

Figure 5:
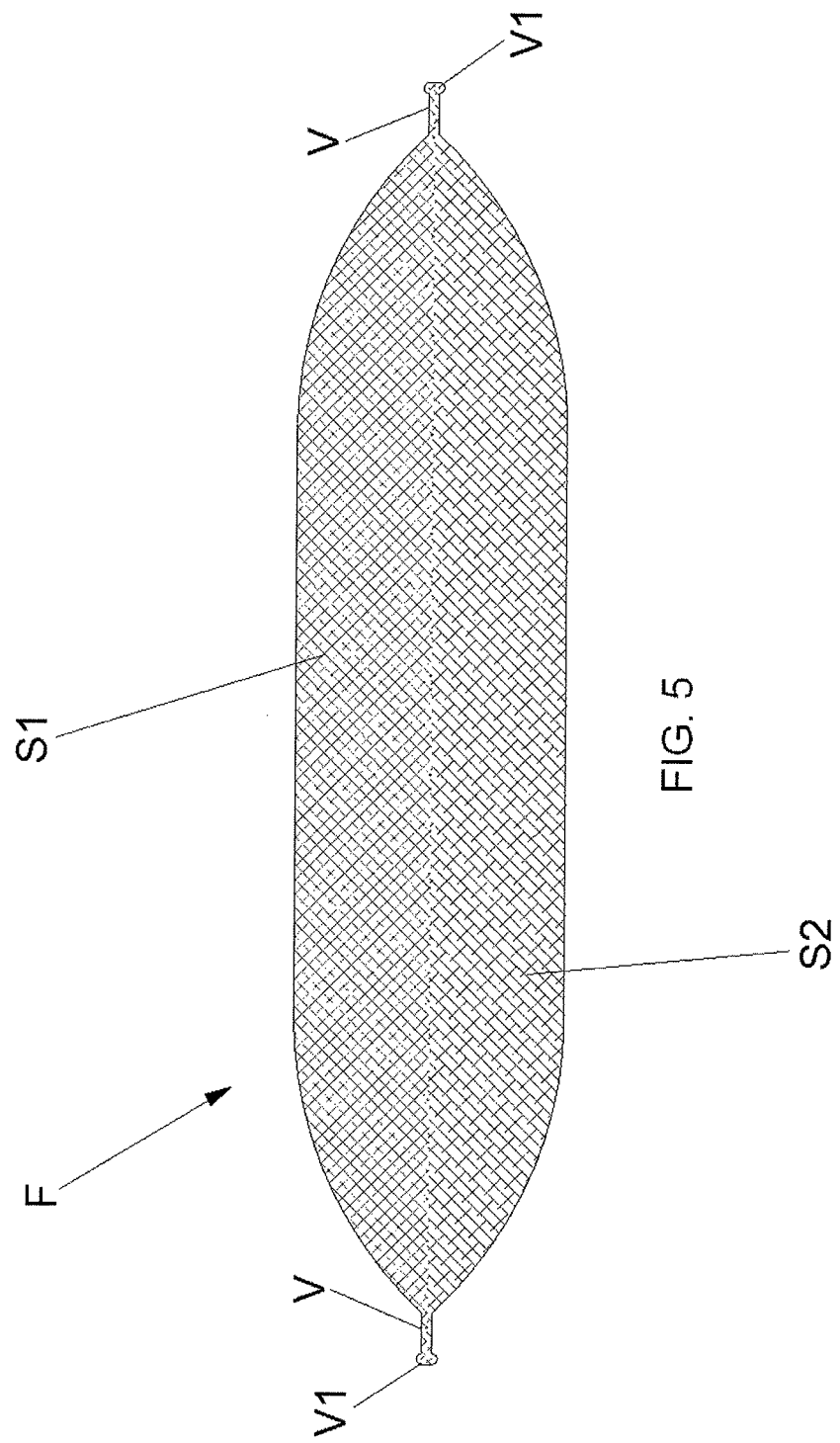
FIG. 5 is a diagrammatic view of the bottom that has just been extracted from the mold of the invention.

In any case, once reticulation and setting of the two layers (S1, S2) are completed, the two lids (1, 2) are opened and the molded bottom (F) is extracted, although partially cooled, as diagrammatically shown in FIG. 5.

Now, the operator can tear off said perimeter seam (B) that surrounds the bottom (F) by simply pulling it with his fingers.

A similar operation is certainly favored by the presence of said thickened border (B1) that, because of higher thickness, can be comfortably and firmly held by the fingers of the operator in charge of removing said seam (B).

Figure 6:
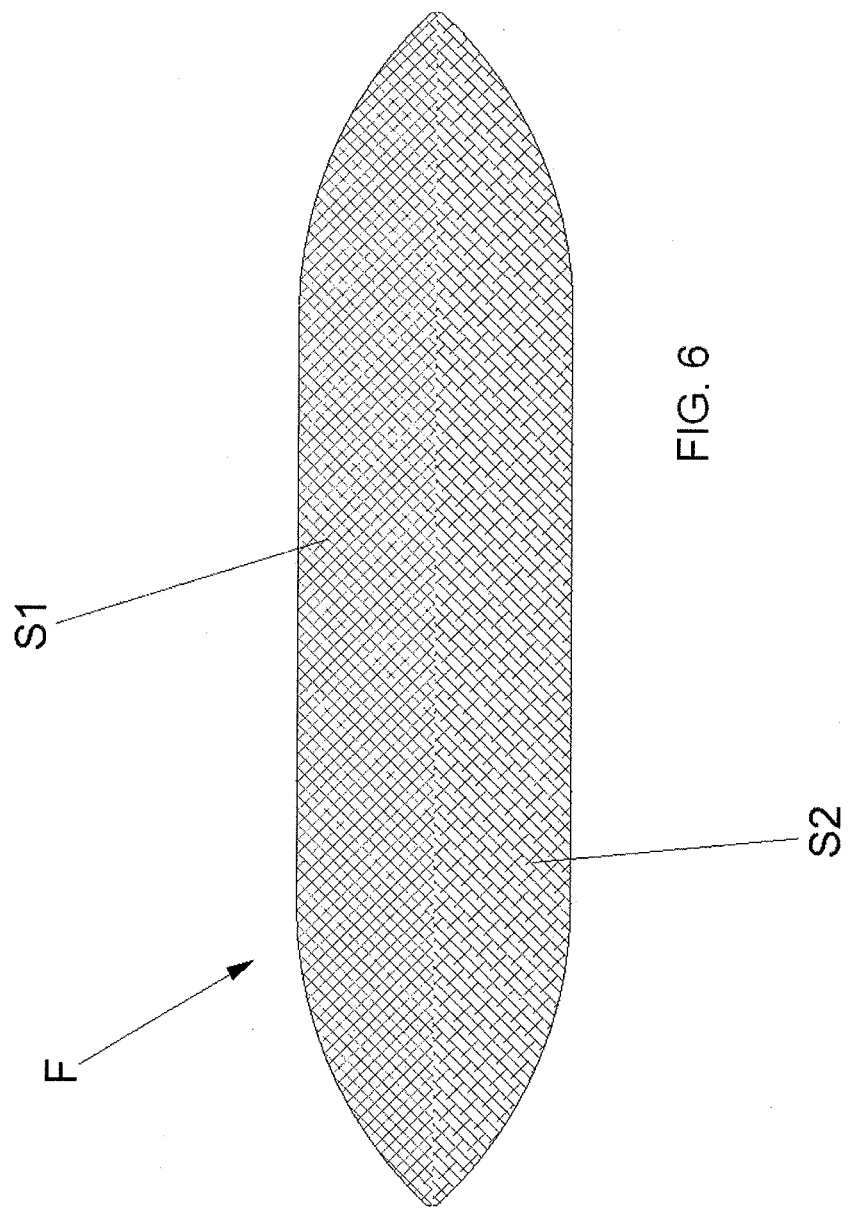
FIG. 6 is a view of the bottom in its final configuration, further to a suitable finishing operation.

In such a way, a perfect separation line between the molding materials of different color used to form the two overlapping layers (S1, S2) is obtained on the side of the molded bottom (F), as shown in FIG. 6.

As mentioned in the preamble, it is understood that, following to suitable shaping of the cavities (10, 20) of the two lids (1, 2), the mold of the invention can be also used to mold any other manufacture with monolithic structure composed of two layers of different expandable reticulable polyolefin materials.

The invention claimed is:

1. A mold for footwear bottoms and other manufactures composed of two overlapping layers of expandible reticulable polyolefin materials, comprising:
   an upper lid defining a cavity for molding a first layer of expandible reticulable polyolefin materials;
   a lower lid defining a corresponding cavity for molding a second layer of expandible reticulable polyolefin material, adapted to be interfaced with said cavity of the upper lid; and
   a plate adapted to be exactly interposed between said two upper and lower lids in such a way to simultaneously close said cavities,
   wherein:
   said cavity of the upper lid is joined with a first perimeter channel,
   said cavity of the lower lid is joined with a second perimeter channel adapted to be exactly interfaced with said first perimeter channel of the upper lid, and
   said plate is provided on lower and upper sides thereof with specular ribs, said specular ribs being adapted to be exactly engaged into a corresponding channel of the upper lid and the lower lid.

2. A mold as claimed in claim 1, wherein said first perimeter channel of the upper lid and said second perimeter channel of the lower lid are both provided at an external end with grooves adapted to be exactly interfaced.

* * * * *